United States Patent [19]
Vermilion et al.

[11] Patent Number: 5,773,143
[45] Date of Patent: Jun. 30, 1998

[54] ACTIVATED CARBON COATED CERAMIC FIBERS

[75] Inventors: Donn Vermilion, Newark; Robert Kaufman, Granville, both of Ohio

[73] Assignee: Owens-Corning Fiberglas Technology Inc., Summit, Ill.

[21] Appl. No.: 640,642

[22] Filed: Apr. 30, 1996

[51] Int. Cl.$^6$ .................................................... D02G 3/00
[52] U.S. Cl. ............................ 428/368; 428/357; 428/364; 428/367; 428/378
[58] Field of Search ................................. 428/408, 367, 428/368, 378, 357, 364

[56] References Cited

U.S. PATENT DOCUMENTS

| | | |
|---|---|---|
| 3,913,309 | 10/1975 | Chiarotto . |
| 4,373,006 | 2/1983 | Galasso et al. . |
| 4,397,901 | 8/1983 | Warren ..................................... 428/408 |
| 5,055,430 | 10/1991 | Sakamoto et al. . |
| 5,096,519 | 3/1992 | Kawakubo et al. . |
| 5,132,254 | 7/1992 | Stempin et al. . |
| 5,187,021 | 2/1993 | Vydra et al. . |
| 5,196,120 | 3/1993 | White ..................................... 428/368 |
| 5,240,887 | 8/1993 | Lespade et al. . |
| 5,284,685 | 2/1994 | Rousseau . |
| 5,290,491 | 3/1994 | Heraud et al. . |
| 5,334,414 | 8/1994 | Edie et al. . |
| 5,364,821 | 11/1994 | Holland . |
| 5,382,453 | 1/1995 | Mason . |
| 5,391,428 | 2/1995 | Zender ..................................... 428/367 |

*Primary Examiner*—Archene Turner
*Attorney, Agent, or Firm*—C. Michael Gegenheimer; Curtis B. Brueske

[57] ABSTRACT

Ceramic fibers having a coating of activated carbon thereon are disclosed. A process involving coating the ceramic fibers with a carbon source, carbonizing the fibers, and then activating the carbon makes the fibers. The preferred carbon source is asphalt in the form of an aqueous emulsion or a solution. The activated, carbon coated ceramic fibers have excellent filtering properties especially at high temperatures. They perform as well as carbon fibers and have the advantage of lower cost and fewer production difficulties. Conventional carbon fibers are expensive and difficult to produce.

8 Claims, No Drawings

ACTIVATED CARBON COATED CERAMIC FIBERS

TECHNICAL FIELD

This invention relates to activated carbon coated ceramic fibers. The resulting fibers exhibit high strength at high temperatures.

BACKGROUND ART

Industry continues to seek ways to improve ceramic fibers or find less expensive ways to produce them. Carbon fibers are generally expensive and difficult to produce. Activated carbon fibers also are expensive. By producing a carbon coating or activated carbon coating on the surface of a ceramic fiber, the benefits of a carbon surface are obtained without the cost of producing a wholly carbon fiber. On the other hand, activated carbon is easily produced, but in the granular form, it has serious disadvantages of bulk transport compared to fibers. By producing activated carbon on the surface of a ceramic fiber, the advantage of the high bulk transport and low cost can be achieved. Also, the advantage of using ceramic fibers in place of glass fibers is that ceramic fibers will retain their strength after processing.

The high resistance to heat makes carbon fibers or activated carbon fibers useful as insulation or reinforcements in hot environments. The aerospace industry easily uses these fibers because of the extreme environment these products see.

DISCLOSURE OF INVENTION

This invention relates to ceramic fibers having a coating of activated carbon thereon. The coated ceramic fibers can be made by a process comprising the steps of coating the fibers with carbon source, carbonizing the fibers, and then activating the carbon. The preferred carbon source is asphalt in the form of an aqueous emulsion. The fibers are heated to carbonizing temperature at a heat-up rate between 2° C. per minute and 100° C. per minute, carbonized at a temperature between 600° C. and 1600° C. in an inert atmosphere, and then activated at a temperature between 500° C. and 1100° C. in an atmosphere containing oxidizing gas.

The resulting coated ceramic fibers have a high surface area of activated carbon. The coated fibers can be used where activated carbon fibers would be used. Examples include high temperature filtration. For example, they can be used for air filtration such as in face masks for suppression of unpleasant odors, and in filters to remove tobacco and other smells in autos and homes. They can be employed in the recovery of solvents or other volatile organic compounds from the air. Examples include removing volatiles when processing asphalt, filtering paint solvent from the air when processing paints, or filtering noxious fumes such as sulfides from the air during chemical reactions. In addition, the fibers are less expensive because we avoid the costs of making and activating carbon fibers.

BEST MODE FOR CARRYING OUT THE INVENTION

The coated ceramic fibers of this invention have a high surface area of activated carbon. The fibers can be made by a process which consists of coating ceramic fibers with a carbon source, preferably an asphalt emulsion, carbonizing the fibers, and then activating the carbon.

The present invention is concerned with active (or "activated") carbon. Active carbon is an amorphous form of carbon characterized by high internal porosity and consequently high adsorptivity either for gases and vapors, or for liquids. Active carbon typically obtained by the pyrolysis of wood, nut shells, animal bones or other carbonaceous material, and "activation" by heating to 800° C. to 900° C. using steam or carbon dioxide.

Often, the method of producing activated carbon includes pre-treating the carbonaceous material. One pre-treating process subjects the carbon to a microwave discharge (such that the material attains a temperature of 800° C.), in an atmosphere which is such that flame generation is substantially prevented.

Another pre-treating process carbonizes the carbon prior to activating it. One application of this where industry coats the fibers with asphalt. Heating carbonizes the asphalt coating on the fibers in an inert atmosphere. The carbonizing temperature generally ranges from 600° C. to 2200° C. The inert atmosphere may be any inert gas such as helium or argon. The carbonized, asphalt coated fibers then are subjected to the activated carbon process.

The ceramic fibers we employ vary widely. The term "ceramic fibers" refers to a group of fibers as is generally known in the art. By way of example, not limitations, ceramic fibers are commercially available as Refrasil®, from Hitco, Irving, Calif.; Nicalon™, from Nippon Carbon Co., Ltd, Tokyo, Japan; and Fiberfrax®, from Stemcore Corp., Cleveland, Ohio. Refrasil fibers represents a group of fibers having outstanding high temperature resistance. Refrasil fibers have a $SiO_2$ content ranging up to 99% and usually are made by leaching E glass fibers. Fiberfrax fibers are ceramic fibers made from alumina and silica. They are available in bulk form as blown, chopped, long stable, paper, or roving fibers. Nicalon fibers represent still another group of ceramic fibers. These ceramic fibers are silicon carbide (SIC) fibers.

Our preferred source of carbon is asphalt. However, pitch from petroleum or coal, or polymers such as phenol-formaldehyde resin and polyacrylonitrile, could also be used as the carbon source. The specific carbon source is not critical, and the preferred material depends on availability, cost and processing parameters. The yield will vary with the starting material.

The common source of asphalt is the residue or bottoms from the petroleum refining industry, but a naturally occurring asphalt can also be used. AC grades of asphalt are preferred because they are soft and easily emulsified, and thus easy to process. Suitable grades can vary between AC-2.5 and AC-30 and AC-20 is most preferred because of its low cost and ready availability. Lower viscosity asphalt grades can be used, but generally will give lower carbon yields. Higher viscosity grades can be used, but become increasingly more difficult to emulsify. More aromatic types such as propane washed asphalt can also be used to give higher yields of carbon.

We apply the asphalts to the ceramic fibers as an aqueous emulsion, or as a solution of asphalt in a solvent. An emulsion can be produced by techniques well known in the art, for example, by using a colloid mill to emulsify a dispersion of asphalt and surfactant in water. The asphalt solids are diluted to facilitate coating. Processing and coating weight will determine the amount of asphalt solids, with a typical emulsion containing between about 5% and about 20% by weight asphalt solids. Commercially available asphalt emulsions can also be used, such as, for example, a "Medium Set Emulsion" (penetration of 125 dmm by ASTM Method DS) manufactured by Koch Materials Company, Heath, Ohio.

A cationic, anionic or nonionic surfactant is present in an amount sufficient to emulsify the asphalt, typically between about 1% and about 5% by weight, and preferably between about 2% and about 2.5%. A preferred anionic surfactant is Indulan-SAL, a lignin-derived surfactant, manufactured by Westvaco Chemical. A preferred cationic surfactant is Aerosurf AA57 or AA60, containing amine functionalities, manufactured by Witco Corporation. The pH of the emulsion can be adjusted to give maximum stability to the emulsion and will vary depending on the surfactant type. Anionics are typically adjusted to a pH greater than 10.5, and cationics are typically adjusted to a pH less than 3.

As an alternative to an asphalt emulsion, an asphalt solution can be made by dissolving asphalt in a solvent such as toluene or trichloroethane. The solution is then applied to the ceramic fibers.

The asphalt emulsion or asphalt solution is applied in sufficient amounts so that the final coated ceramic product after carbonizing and activation contains between about 5% and about 40% by weight activated carbon, preferably between about 3% to about 30%, and more preferably between about 5% and about 25%. Before carbonizing, the coated fibers contain between about 20% and about 50% by weight carbon, and preferably between about 30% and about 40%.

We can use any process to coat the fibers with carbon. For example, the fibers can be coated with the asphalt emulsion or asphalt solution using conventional equipment that had been employed in the past to spray a binder onto the fibers. Alternatively, we simply can immerse the fibers in an asphalt emulsion or asphalt solution onto the fibers. Another method of coating the fibers is by vapor phase deposition: the asphalt is vaporized in a chamber with the fibers and then cooled to deposit on and coat the fibers.

After application of the asphalt emulsion or asphalt solution to the ceramic fibers, the fibers can be collected by any convenient means, for example, as a blanket on a conveyor or wound into a reinforcement package of continuous strands. We then heat the asphalt coated fibers at a temperature and for a time sufficient to remove water or solvent.

Preferably, the coated fibers are "cured" by heating at a temperature between about 200° C. and about 400° C. to produce an infused asphalt coating on the fibers. Curing improves the strength of the fibers and makes them well adapted for handling.

We then subject the fibers to a carbonizing step which includes heating the fibers to carbonizing temperature in an atmosphere of inert gas. The heat-up rate is between 2° C. and 100° C. per minute, preferably between 5° C. and 15° C. per minute, and more preferably 10° C. per minute.

In the carbonization step, the carbon source is reduced or converted to carbon by pyrolysis. The carbonizing temperature is generally between about 600° C. and about 1600° C., and preferably between about 600° C. and about 1100° C. The inert atmosphere may be any inert gas such as argon, nitrogen, helium or neon, with argon being preferred. "LOI" is a measurement for the weight percent carbon in the carbonized fibers. It is determined by burning off all the carbon from the glass and then calculating the weight "Loss On Ignition" by the following formula:

LOI=[(Initial Weight−Final Weight)÷Initial Weight]× 100%. After the carbonization step, the LOI should be between about 5% and about 90% for purposes of the present invention, and preferably between about 20% and about 60%. Higher LOI's have more carbon available for activation, but at some point become continuous masses of carbon rather than a coating on fibers, and thus lose their efficiency and porosity gained by the high volume and surface areas of the fibers. At the low end, the amount of carbon present becomes too low to effectively filter materials.

The carbonized fibers are then "activated" through oxidation of a part of the carbon and the resulting formation of a highly porous structure. The activation process involves thermal activation of the carbonized material using an oxidizing gas such as oxygen, $CO_2$ or water vapor. In all cases, the reaction involves the oxidation of carbon to CO or $CO_2$. The reaction with water vapor proceeds at around 700° C., while $CO_2$ requires approximately 900° C. Using $CO_2$ is easier to control than water vapor. However, water vapor has the lower temperature of activation at 700° C. The ease of using $CO_2$ usually makes it the preferred method.

The activation step is conveniently started by changing the atmosphere surrounding the fibers from the inert atmosphere used during carbonization to an atmosphere containing some oxidizing gas. For example, the ceramic fibers can be carbonized in an atmosphere of argon, and then to start the activation process carbon dioxide can be introduced into the atmosphere. In a preferred process, the oxidizing atmosphere has a ratio of $CO_2$ to argon of about 25/75 ($CO_2$/argon) by weight. The amount of oxidizing gas in the atmosphere can be increased up to 100% by weight to increase the rate of pore formation during the activation step, or decreased down to about 5% by weight to increase control of the activation process. Preferably, the atmosphere contains between about 10% and about 40% by weight oxidizing gas and between about 60% and about 90% by weight inert gas.

The extent of activation depends on the amount of oxidizing gas, the temperature, and the duration of exposure to the hot oxidizing gas; as activation continues, the pores are enlarged and the weight of the remaining carbon decreases. This is reflected in increasing specific surface area (in square meters per gram of carbon) as determined by nitrogen absorption at 195° C. using the well-known "B.E.T." method developed by Brunauer, Emmett and Teller. Too much activation would oxidize too much carbon to a gas, while too little activation would create insufficient pores for effective filtering. Accordingly, the activation process is carried out until the surface area of the coated fibers ranges from 50 $m^2$/g. carbon to 2000 $m^2$/g. carbon, preferably between 200 $m^2$/g. carbon and 1000 $m^2$/g. carbon. Typical activation times are between 10 minutes and 5 hours, and depend on the particular process and materials.

After the carbon on the ceramic fibers has been activated to the desired extent, the activation process is ended by cooling the fibers. Preferably, the fibers are cooled to below about 200° C. in an inert atmosphere.

Example I

We coated samples of Refrasil ceramic fibers with an asphalt emulsion using a flood and extract method. The emulsion contained about 36% asphalt, about 62% water and about 2% Indulan Sal emulsifier. We then heated the asphalt coated samples at a rate of 10° C. per minute under a blanket of argon. Once the samples were at 900° C., the blanket gas was changed to a mixture of 25% carbon dioxide/75% argon by weight. The samples were held at 900° C. for various lengths of time to produce surface active sites. The surface areas of the samples were measured by the B.E.T. method. The results are shown in Table 1 as follows:

TABLE 1

| Sample | Gas | Heating Time | LOI | Surface Area |
|--------|-----|--------------|-----|--------------|
| 1 | Argon | 60 min. | 6.3% | 4.81 m$^2$/g.C |
| 2 | Ar/CO$_2$ | 5 min. | 10.2% | 3.12 m$^2$/g.C |
| 3 | Ar/CO$_2$ | 25 min. | 7.7% | 256 m$^2$/g.C |
| 4 | Ar/CO$_2$ | 60 min. | 8.2% | 695 m$^2$/g.C |

Samples 3 and 4 had a high surface area of activated carbon and strength and heat resistant properties essentially the same as conventional carbon fibers.

Example II

We next used Ashland Pitch A-170 from petroleum cut with tricholorethane to give 10% pitch by weight. Samples of Refrasil fibers as in Example I were dipped in the solution to coat the fibers. The samples were dried at 204° C. overnight. The samples were then heated under argon at a rate of 10° C. per minutes to 900° C. They were held at 900° C. for various lengths of time under argon/CO$_2$ 75/25 at a flow rate of 225 cc/minute. The results are shown in Table 2 as follows:

TABLE 2

|  | Sample 1 | Sample 2 | Sample 3 |
|--|----------|----------|----------|
| LOI Before Activation | 36.2% | 31.8% | 37.7% |
| Hold Time at 900° C. | 1 Hour | 2 Hours | 3 Hours |
| LOI After Activation | 27.0% | 23.3% | 22.9% |
| Surface Area (m$_2$/gC) | 555 | 616 | 695 |

The resulting ceramic fibers had a high surface area of activated carbon and compared favorably with activated carbon fibers. They also had excellent filtering properties especially for high temperature filtration of gases.

We claim:

1. Ceramic fibers having a coating hereon, the coating comprising activated carbon.

2. Ceramic fibers according to claim 1 wherein the coating comprises asphalt which is carbonized and activated.

3. Ceramic fibers according to claim 1 wherein the coated ceramic fibers contain between 5% and 40% by weight activated carbon based on the total weight of the carbon and ceramic fibers.

4. Ceramic fibers according to claim 3 wherein the coated ceramic fibers contain between about 3% and about 30% by weight activated carbon.

5. Ceramic fibers according to claim 1 wherein the coated ceramic have a surface area ranging from 50 m$_2$/g. carbon to 2000 m$_2$/g. carbon.

6. Ceramic fibers according to claim 5 wherein the coated ceramic fibers have a surface area ranging from 200 m$_2$/g. carbon to 1000 m$_2$/g carbon.

7. Ceramic fibers according to claim 1, wherein the ceramic fibers have high temperature resistance, an SiO$_2$ content of up to about 99%, are comprised of silica and alumina, or are comprised of silicon carbon fibers.

8. Ceramic fibers according to claim 1, wherein the ceramic fibers have high temperature resistance.

* * * * *